United States Patent [19]

Ramsteck

[11] 4,166,035

[45] Aug. 28, 1979

[54] FILTER PLATE FOR FILTER PRESS

[75] Inventor: Wolfgang Ramsteck, Illerieden, Fed. Rep. of Germany

[73] Assignee: Lenser Verwaltungs-GmbH, Senden, Fed. Rep. of Germany

[21] Appl. No.: 917,161

[22] Filed: Jun. 20, 1978

[30] Foreign Application Priority Data

Jul. 27, 1977 [DE] Fed. Rep. of Germany ....... 2733769

[51] Int. Cl.² ............................................. B01D 25/12
[52] U.S. Cl. .................................... 210/231; 210/227; 100/198
[58] Field of Search ............... 210/224, 227, 230, 231; 100/198

[56] References Cited

U.S. PATENT DOCUMENTS

| | | | |
|---|---|---|---|
| 3,289,845 | 12/1966 | Weber | 210/231 |
| 3,390,772 | 7/1968 | Juhasz | 210/66 |
| 3,926,811 | 12/1975 | Ramsteck | 210/231 |
| 3,931,014 | 1/1976 | Heimbach et al. | 210/231 |
| 3,988,242 | 10/1976 | Kurita et al. | 210/227 |

FOREIGN PATENT DOCUMENTS 174983 3/1905 Fed. Rep. of Germany ........... 210/224

Primary Examiner—Charles N. Hart
Assistant Examiner—David R. Sadowski
Attorney, Agent, or Firm—Karl F. Ross

[57] ABSTRACT

A filter-plate assembly for a filter press has a substantially rigid support plate against which bears a filter plate. This filter plate is integrally formed of elastically deformable material and has an annular outer frame which lies against the support plate and defines a frame plane. A generally planar and elastically deformable central panel lies in a panel plane and is displaceable relative to the frame between a normal position to one side of the frame plane and lying against the support plate and a pressing position to the other side of the frame plane. This panel is formed with an array of bosses projecting away from the support plate. An annular web has an outer periphery connected to the frame at the frame plate and an inner periphery connected to the panel at the panel plane. This web is relatively thin and elastically deformable like the central panel and has a surface area which is greater than the surface area of the projection of the web on the frame plane.

9 Claims, 4 Drawing Figures

FILTER PLATE FOR FILTER PRESS

FIELD OF THE INVENTION

The present invention relates to a filter press. More particularly this invention concerns a filter-plate assembly for use in such a press.

BACKGROUND OF THE INVENTION

A filter press is known having a plurality of axially spaced filtering chambers each defined between a pair of filter cloths each in turn lying on a respective filter plate. The material to be filtered is introduced into the chambers between the cloths and the filtrate is withdrawn from between each cloth and the respective filter plate. The filtrant is removed by compressing it between the cloths periodically. This is achieved by displacing each of the filter plates inwardly into the respective filter chamber so that the filter cake on the respective filter cloth can be pressed against the filter cake of the other filter cloth of the respective chamber to form a relatively dry and easily removable block of filtrant. Such a filter press, which is described in the commonly owned U.S. Pat. No. 3,926,811 and commonly owned application Ser. No. 886,613 filed Mar. 14, 1978, allows the filter to be cleaned in a relatively simple manner, even automatically if desired.

The filter plates of such devices are typically the first parts to wear out. These plates are normally formed as an outer frame, an inner panel portion, and deflectable web structure between the inner panel and outer frame. The central panel is displaced axially relative to the frame for the pressing operation. During such displacement the web structure must deform. Most such plates are made of an at least limitedly elastically deformable synthetic resin so that they will be as long lasting and durable as possible. The disadvantage of this structure is, however, that such synthetic-resin material normally has little tensile strength. Thus the web structure can be deformed and compressed considerably, but when subjected to any tension beyond a certain relatively low limit such web structure normally will fail. As it is essential to maintain a closed chamber between each of the filter plates and the respective support plate, which may be a rigid support plate or another filter plate, any leakage through the web structure must be immediately repaired for proper operation of the device so that the area behind each of the filter plates can be filled with a fluid to displace the respective filter plate into the pressing position.

Such an arrangement works particularly well when the central panel of the filter plate is rigid. When, however, a relatively thin central panel is employed which is elastically deformable considerable tension is applied to the web structure. This is true even where the elastically deformable central panel is provided with a plurality of bosses to hold the filter cloth out for aspiration of the filtrate.

OBJECTS OF THE INVENTION

It is therefore an object of the present invention to provide an improved filter plate.

Another object is the provision of a filter-plate assembly which has a relatively long service life, even with an elastically deformable central panel.

SUMMARY OF THE INVENTION

These objects are attained according to the instant invention in a filter-plate assembly of the above-described general type wherein each filter plate is mounted adjacent a substantially rigid support plate. Each of these filter plates has an annular frame lying against the support plate and defining a frame plane. The plate also has a generally planar elastically deformable central panel defining a panel plane generally parallel to the frame plane and displaceable between a normal position to one side of the frame with the panel lying against the support plate and a pressing position to the other side of the frame plane. This panel is formed with an array of bosses projecting away from the support plate. An annular web is provided which is wholly elastically deformable and of uniform thickness. This web has an outer periphery connected at the frame plane to the frame and an inner periphery connected at the panel plane to the central panel. Furthermore this web has a surface area which is greater than the surface area of the projection of this web of the frame plane. Thus when displaced from the normal to the pressing position the web will be entirely subjected to compression, so that the service life of the assembly will be correspondingly increased. In fact the entire surface area of the central panel plus the web is substantially greater than that of the projection of these parts on the frame plane, so that neither the panel nor the web will be subjected to stresses other than compressive or bending stresses.

According to further features of this invention the web and the panel are of substantially the same relatively thin thickness, except of course at the bosses on the panel. Furthermore the frame plane lies substantially equidistant between the two planes in which the panel lies in the normal and pressing positions.

Such an arrangement allows the pressing surface of the filter plate to be increased considerably. This can be achieved by pre-shaping the pressing panel inside the rigid frame therefor by deforming it under controlled conditions beyond its elastic limit during manufacture. In fact the web in this arrangement acts with the panel as a pressing element so that all of the filter cake carried on the cloth spanned over the filter plate can be pressed.

SPECIFIC DESCRIPTION

Figure 1:
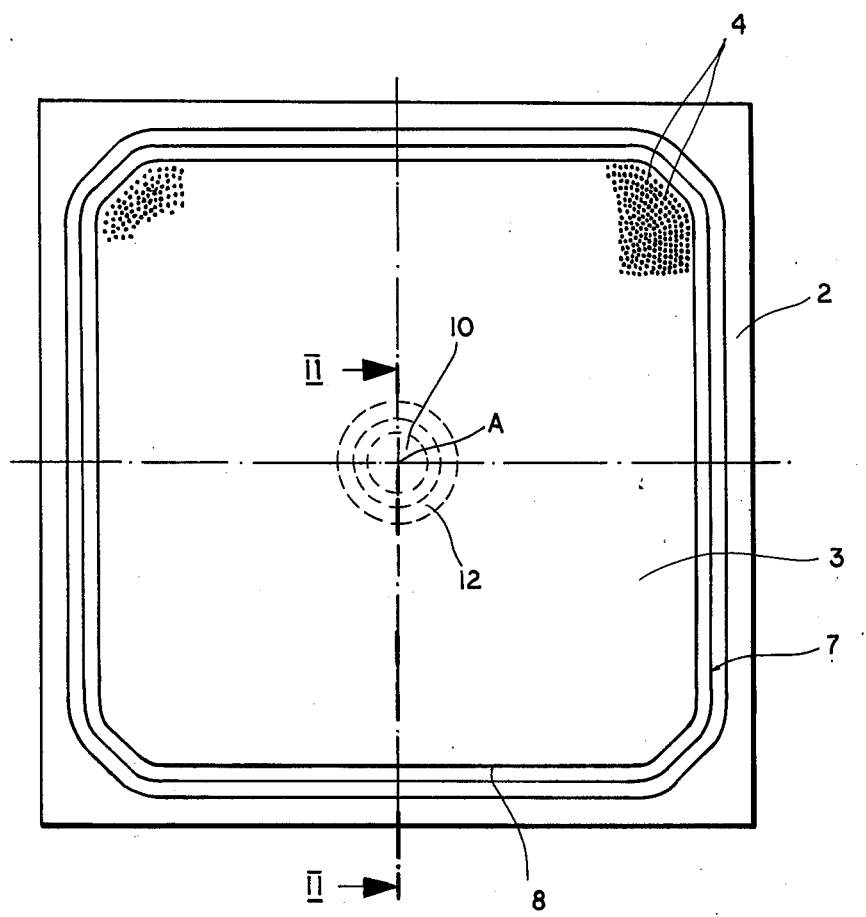
FIG. 1 is an axial end view of a filter plate according to this invention.
Figure 2:
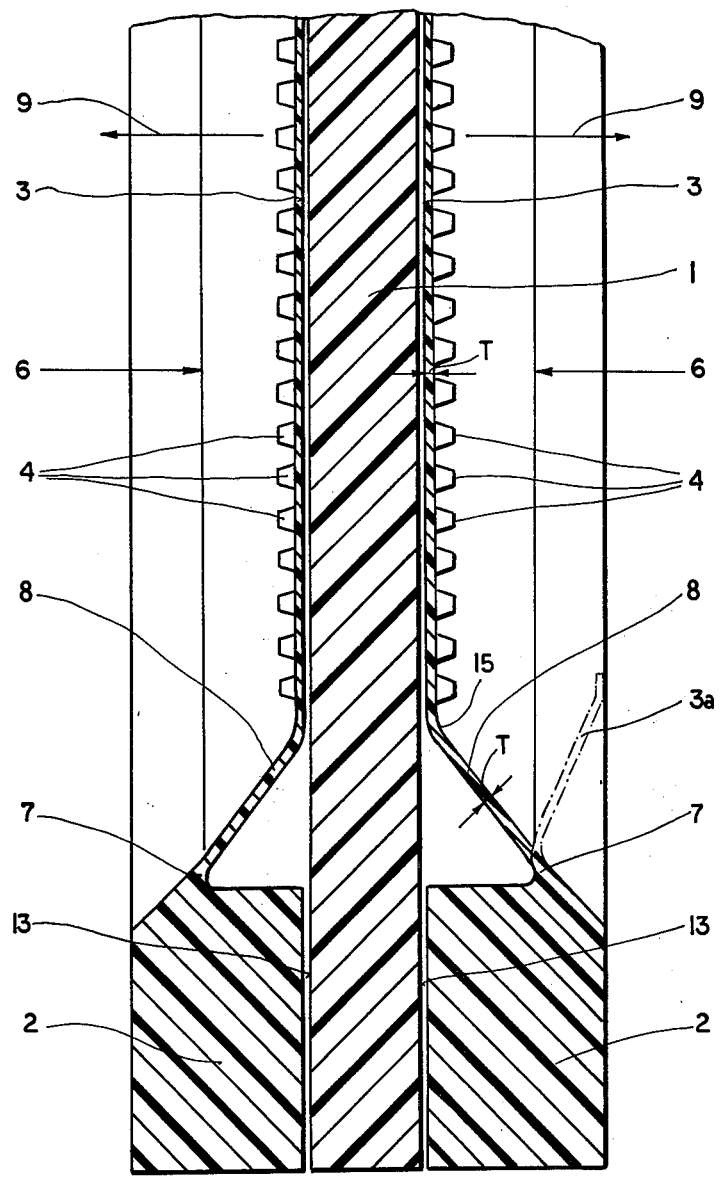
FIG. 2 is a section taken along line II—II of FIG. 1.

As shown in FIGS. 1 and 2 a filter-plate assembly according to this invention has a synthetic-resin rigid support plate 1 extending perpendicular to an axis A of the assembly and having a pair of planar parallel surfaces against each of which lies an elastically deformable central panel 3 of a respective filter plate. Each of these filter plates has a rigid outer frame 2 connected via a respective elastically deformable web 8 to the respective central panel 3. Each panel 3 is formed with outwardly and axially directed bosses 4 as described in the above-cited copending application 886,613. A filter cloth 5 (see FIG. 3) overlies each of the filter plates.

Each of the webs 8 has an outer periphery 7 connected to the respective frame 2 at a frame plane 6 perpendicular to the axis A and an inner periphery 15 connected to the outer periphery of the respective panel 3. Furthermore each of these webs 8 has a thickness T substantially equal to the thickness T of the central panel 3. Each of the panels 3 is formed with a central throughgoing hole 10 surrounded by a thickened central frame 11 connected via a relatively thin web 12 to the inner periphery of the panel 3. Material to be filtered is introduced through the axially aligned holes 10 to the chambers defined between adjacent pairs of filter plates. Filtrate is withdrawn between each cloth 5 and the respective filter plate at holes 16 (see FIG. 3) and fluid under pressure may be introduced via passages 17 behind each of the panels 3 to displace the same outwardly in the direction of arrow 9 from the solid-line normal position shown in FIGS. 1 and 2 to the dot-dash line position shown at 3a in FIG. 2. During such deformation each of the webs 8 in the corresponding panel 3 is subjected only to bending and compressive forces, but to no tension.

Figure 3:
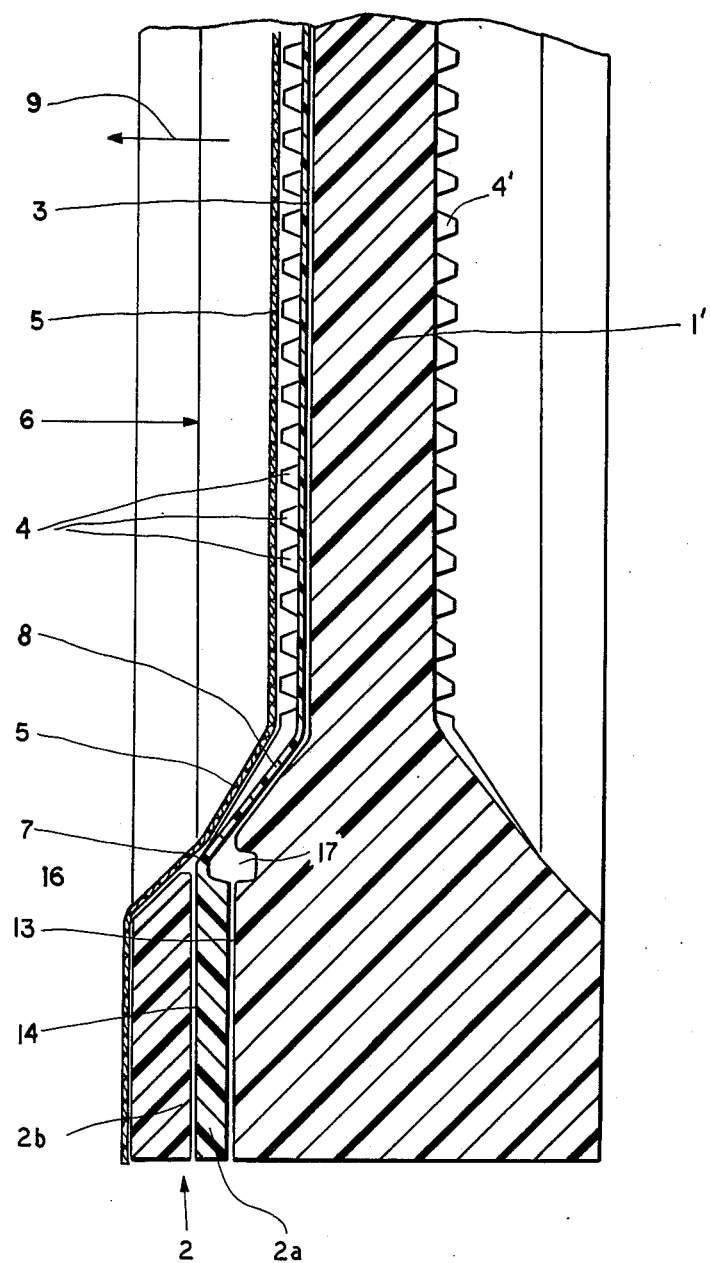
FIGS. 3 and 4 are sections similar to FIG. 2 showing further arrangements in accordance with this invention.

Each of the filter plates is normally unitarily formed along a joint 13 by heat-sealing or the like with the respective plate 1. It is also possible as shown in FIG. 3 to form the frame 2 of a pair of separate parts 2a and 2b welded along a surface 14 to provide the necessary rigidity, as the part 2b can be made substantially less elastic than the part 2a. FIG. 3 also shows how the support 1 can be replaced with a support 1' whose face is formed with bosses 4' so that only one filter plate is displaceable in each of the filter pressing chambers.

Figure 4:
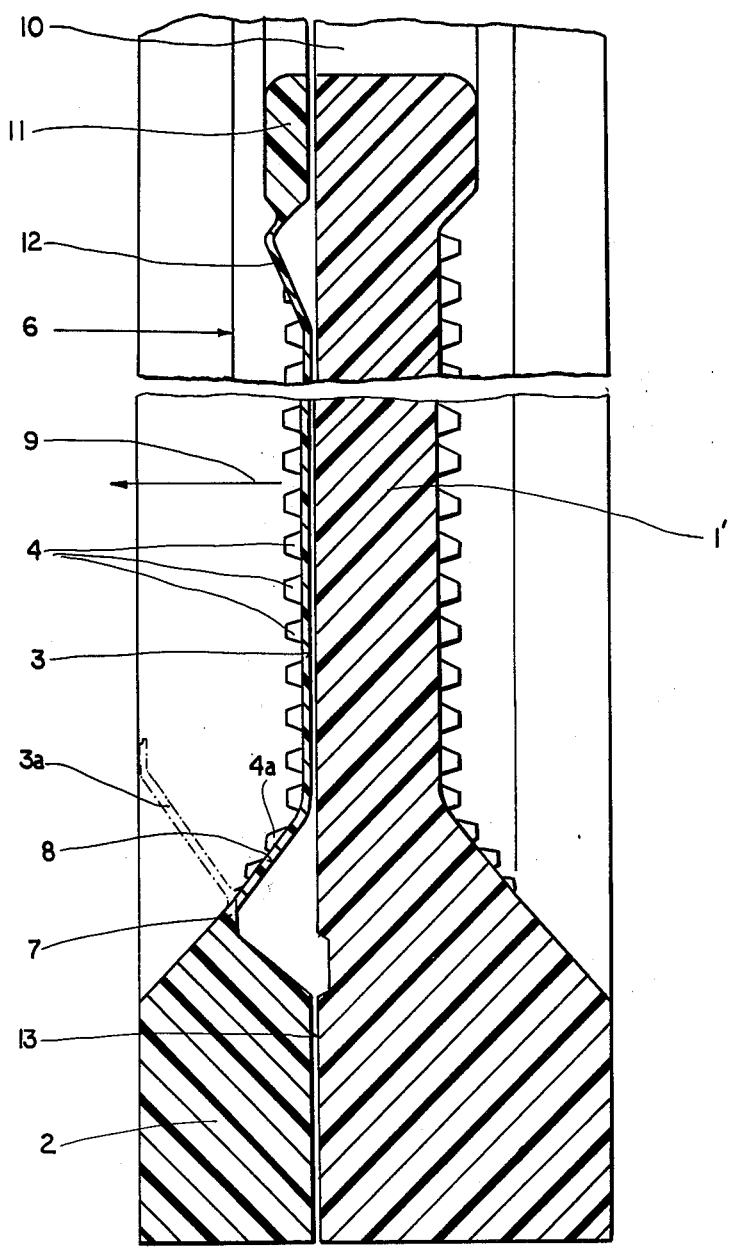

FIG. 4 shows another arrangement wherein the support 1' of FIG. 3 is used and the web 8 is provided with formations 4a like the formations 4. The web 12 around the central opening 10 is also seen in FIG. 4.

I claim:

1. A filter-plate assembly for a filter press, said assembly comprising a substantially rigid support plate and a filter plate, said filter plate being formed integrally with:
    an annular frame lying against said support plate and defining and lying in a frame plane spaced from and generally parallel to said support plate;
    a generally planar and elastically deformable central panel defining and lying in a panel plane and displaceable between a normal position to one side of said frame plane and lying against said support plate and a pressing position to the other side of said frame plane, said panel being formed with an array of bosses projecting away from said support plate; and means including an annular web between said central panel and said frame and having an inner periphery connected to said central panel and lying in said panel plane and an outer periphery connected to said frame and lying in said frame plane, said web being wholly elastically deformable and of uniform thickness, said web further having a surface area greater than the surface area of the projection of said web on said frame plane, said means being constructed and arranged to be substantially completely relaxed and free of tensile stresses in said normal and pressing positions and being subject substantially only to bending and compressing stresses on displacement between said positions.

2. The assembly defined in claim 1 wherein said surface area of said web is sufficiently large that said panel can move between said positions without tensioning, but solely with compression, of said web.

3. The assembly defined in claim 2 wherein said frame plane is generally equidistant between the panel planes in said positions of said panel.

4. The assembly defined in claim 2 wherein said panel and said web are of substantially the same thickness.

5. The assembly defined in claim 2, further comprising means for introducing a fluid under pressure between said panel and said support plate for displacing said panel into said pressing position.

6. The assembly defined in claim 5, further comprising a filter cloth overlying said bosses of said panel.

7. The assembly defined in claim 6, further comprising means for withdrawing a filtrate from between said cloth and said filter plate.

8. The assembly defined in claim 7 wherein said support plate is rigid and generally immovable relative to said frame.

9. The assembly defined in claim 8 wherein said filter plate is formed of a synthetic resin.

* * * * *